Dec. 27, 1932.  J. WAHL ET AL  1,892,088

PRESSURE GAUGE

Filed April 30, 1927

INVENTORS:
John Wahl and
Otto Melzer,
By Attorneys,
Fraser Myers & Manley

Patented Dec. 27, 1932

1,892,088

UNITED STATES PATENT OFFICE

JOHN WAHL, OF ROSEDALE, AND OTTO MELZER, OF HOLLIS, NEW YORK, ASSIGNORS TO A. SCHRADER'S SON, INC., OF NEW YORK, N. Y., A CORPORATION OF NEW YORK

PRESSURE GAUGE

Application filed April 30, 1927. Serial No. 187,909.

This invention relates to pressure gauges and aims to provide certain improvements therein. More particularly, the invention is directed to pressure gauges of the type wherein an indicating member is moved relatively to a casing to indicate pressures by means cooperating with a spring-resisted, pressure-responsive member when the latter is acted upon by fluid pressure.

In the large quantity production of such gauges, limited variations in the dimensions, physical properties, etc., of the various elements which constitute the gauge are tolerated, and because of these tolerations the elements are first tested and assorted and are so chosen in assembling the various elements as to compensate for the variations existing therein. To assemble the gauges without first resorting to these preliminary testing operations would introduce a critical error in the gauges. Notwithstanding these preliminary testing operations, it is frequently found in testing the gauges after assembly that the indicating member is moved outwardly a greater or lesser distance than the calibrated scale markings warrant for a given pressure. This is especially true in the low pressure gauges designed for use in testing balloon tire pressures where a small variation in pressure produces a relatively large movement of the indicating member. To remedy this condition a different spring or a different elastic thimble, when such element is employed, must be substituted for the one in the gauge. The preliminary testing operations, as well as the substitution operation after assembly, it will be obvious, require considerable time, and therefore add to the cost of the gauges.

According to the present invention we provide a pressure gauge so constructed that all preliminary testing operations are rendered unnecessary and in which but a simple adjustment of one of the gauge elements after assembly is required to adjust the normal zero position of the indicating member and thereby correct any deviation in the true reading of the indicating member. This we accomplish by providing the pressure-responsive member with means for adjusting the normal relative position of the indicating member with respect to the pressure-responsive member after said gauge parts have been assembled in the casing. In a preferred embodiment of our invention the pressure-responsive member is in the form of a spring-pressed piston provided with adjustable means extending axially with respect thereto and adapted to be adjusted longitudinally with respect to the piston. The invention also embodies other features of novelty which will be hereinafter more fully described.

A preferred embodiment of our invention is illustrated in the accompanying drawing, wherein:—

Figure 1:
Figure 1 is an elevation of the gauge embodying our invention.
Figure 3:
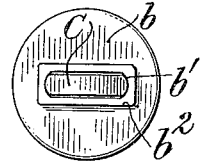
Fig. 3 is a top plan view of the gauge.
Figure 2:
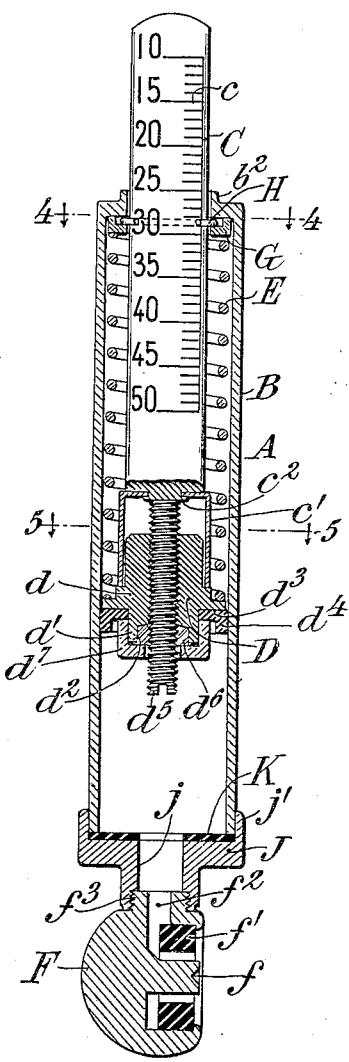
Fig. 2 is a longitudinal section thereof with parts shown in elevation.
Figure 4:
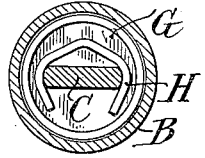
Figure 5:
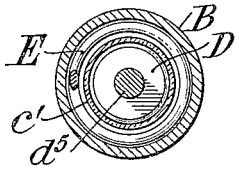

Figs. 4 and 5 are transverse sections taken along the lines 4—4 and 5—5 respectively of Fig. 2.

Figure 6:
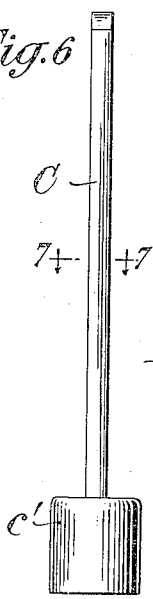

Fig. 6 is an elevation of the gauge bar.

Figure 7:
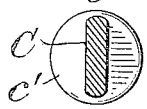

Fig. 7 is a transverse section taken along the line 7—7 of Fig. 6.

Figure 8:
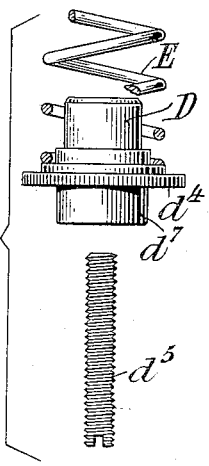

Fig. 8 is a composite view in elevation of certain details of the invention.

Referring to the drawing, let A indicate the pressure gauge as a whole, which comprises a tubular casing B, an indicating gauge bar C slidable through an opening in the top of the casing, a pressure-responsive member or piston D, a loading spring E and a foot portion F.

The casing B is preferably in the form of a deep drawn shell, open at its bottom and closed at its top, as shown at $b$, said top being formed with an opening $b'$, and an integral struck-up lip $b^2$ surrounding said opening. The opening $b'$ is preferably of the same outline as the cross-section of the gauge bar, so that the latter may readily telescope therein and the top of the lip $b^2$ serve as an index to facilitate the reading of the pressure indicia on the gauge bar.

The gauge bar C is preferably in the form of a flat bar having indicia $c$ on the faces thereof and provided at its inner end or foot with a cup-shaped guide member $c'$ which is preferably riveted thereto, as shown at $c^2$.

The piston which is designated as a whole by the reference character D, comprises a supporting element $d$ having an axial screw-threaded opening therethrough, said supporting element being formed with a central boss $d'$ provided with a central recess $d^2$, said boss forming with the element D a supporting shoulder $d^3$ upon which is mounted a piston packing $d^4$. Extending through the axial opening in the element D is a screw-threaded member $d^5$ which is adapted to be held in various adjusted positions by a packing $d^6$ seated in the recess $d^2$. In practice we prefer to employ a single element for holding the packings $d^4$ and $d^6$ in position, and such element is here shown as the cup-shaped member $d^7$, having an opening in its base to clear the screw-threaded member $d^5$, said cup-shaped member $d^7$ being preferably force-fitted over the boss $d^1$.

Positioned within the casing B is the compression spring E which normally acts upon the piston to hold it in its innermost position. The outer end of the spring rests against a cup-shaped washer G which is held against the inner face of the top of the casing by said spring. The washer G is designed to support between its base and the underside of the top of the casing B a split spring ring H, which frictionally engages the lateral sides of the gauge bar C. The arrangement and engagement of the split spring H with the gauge bar is such as to hold said gauge bar in any indicating position to which it has been moved by the pressure-responsive means after said pressure-responsive means has returned to its normal position.

The foot portion F is of conventional form and comprises a tire valve depressor element $f$, a packing gasket $f'$, a fluid duct $f^2$ and a screw-threaded connecting nipple $f^3$. The foot portion is connected to the casing through the medium of a coupling element J having an enlarged axial opening $j$ extending therethrough, said coupling being formed at its bottom with a reduced internally-threaded end adapted to screw-threadedly engage the nipple $f^3$, and at its top is formed with a circumferential flange $j'$ adapted to be force-fitted over the bottom end of the casing B. A packing K is inserted between the coupling J and bottom of the casing B to insure a leak-tight joint at said connection.

In assembling the gauge the parts C, D, E, G and H are inserted into the casing B from the open end thereof with the gauge bar C engaging through the opening $b'$ in the top of the casing. The flange $j'$ of the coupling J, with the packing K seated therein, is then force-fitted over the lower end of the casing B. As thus assembled, the bottom of the member $d^7$ will seat against the packing K, and the grooved end of the screw-threaded element $d^5$ will seat in the opening $j$ of the coupling member. The gauge is now subjected to a known definite pressure and a reading of the calibrated scale C observed. If this reading is greater or less than the true pressure to which the gauge has been subjected, the screw-threaded member $d^5$ is adjusted by a screw driver, which can be passed through the opening $j$, either inwardly or outwardly to compensate for the noted deviation. The gauge is then again tested, and if the calibrated scale does not now record the true pressure, further adjustment is made until upon repeating the testing operation the gauge reading is found to be accurate. The foot portion F is then secured to the coupling J through the screw-threaded connection $f^3$.

From the foregoing description it will be apparent that we have provided a gauge which is extremely simple in construction, economical to manufacture and capable of easy adjustment after assembly to accurately register pressures to which it is subjected. It will also be noted that because of the outwardly projecting lip $b^2$ which surrounds the gauge bar when the latter is moved to indicating position, the reading of the gauge is facilitated and any error which might arise because of parallax, is reduced to a minimum.

While we have shown and described a preferred embodiment of our invention, we do not wish to be limited to the details of construction hereinbefore described, since modifications thereof may be resorted to without departing from the spirit of the invention.

What we claim is:

1. A pressure gauge comprising a casing, a piston movable in said casing, means for resisting the action of pressure when applied to the piston, a pressure indicating member movable by but disconnected from said piston and cooperating with means on the casing to indicate pressures and adjustable means carried by said piston, engageable from the exterior of the casing after the gauge parts are assembled therein, for setting the normal zero position of the indicating member so that it will accurately register the pressures.

2. A pressure gauge comprising a casing, a piston movable in said casing, means for resisting the action of pressure when applied to the piston, a pressure indicating member movable by but disconnected from said piston, and cooperating with means on the casing to indicate pressures and a member carried by the piston and adjustable longitudinally with respect to the axis thereof from the exterior of the casing after the gauge parts are assembled in the casing, for setting the normal zero position of the indicating member so that it will accurately register the pressures.

3. A pressure gauge comprising a longitudinal casing, a piston movable in said casing, means for resisting the action of pressure when applied to the piston, a pressure indicating member telescoping with said casing and movable by said piston and cooperating with means on the casing to indicate pressures and a member extending through the piston and adjustable longitudinally with respect to the axis thereof from the exterior of the casing after the gauge parts are assembled in the casing, for setting the normal zero position of the indicating member so that it will accurately register the pressures.

4. In a pressure gauge or the like, a piston comprising a supporting element having an axial opening therethrough, a movable element extending through said opening, means for holding the movable element against accidental movement, a packing mounted on the supporting element and means holding said packing in position.

5. In a pressure gauge or the like, a piston comprising a supporting element having an axial opening therethrough and a central recess, a movable element extending through said opening, a packing in the recess engaging the movable element, a packing mounted on the supporting element and a member holding both packings in position.

6. In a pressure gauge or the like, a piston comprising a supporting element having a screw-threaded axial opening therethrough and a central boss provided with a recess, a screw-threaded element mounted in the axial opening, a packing in the recess engaging the screw-threaded element, a packing mounted on the supporting element and a member fitted over the boss holding both packings in position.

7. A pressure gauge comprising a casing having an opening in either end, a pressure-responsive member, a pressure-indicating member movable by but disconnected from the pressure-responsive member, means for resisting the action of pressure upon the pressure-responsive member, a calibrated scale on said pressure indicating member, the inner end of the indicating member being normally in abutting relation with the pressure-responsive member, and movable means at the abutting portions of said members for adjusting the normal zero position of the indicating member, said means being adapted to be moved from the exterior of the casing through an end opening therein after the said gauge parts are assembled in the casing, so that the indicating member will accurately register the pressures.

In witness whereof, we have hereunto signed our names.

JOHN WAHL.
OTTO MELZER.